(12) United States Patent
Mace et al.

(10) Patent No.: US 7,403,995 B2
(45) Date of Patent: Jul. 22, 2008

(54) SYMMETRICAL BI-DIRECTIONAL COMMUNICATION

(75) Inventors: Paul B. Mace, Ashland, OR (US);
Darrell C. Kirk-Young, Portland, OR (US)

(73) Assignee: Outhink, Inc., Campbell, CA (US)

( * ) Notice: Subject to any disclaimer, the term of this patent is extended or adjusted under 35 U.S.C. 154(b) by 1095 days.

(21) Appl. No.: 10/338,630

(22) Filed: Jan. 8, 2003

(65) Prior Publication Data

US 2004/0143665 A1 Jul. 22, 2004

(51) Int. Cl.
*G06F 15/16* (2006.01)

(52) U.S. Cl. .................. 709/227; 709/203; 709/217; 709/219; 709/228

(58) Field of Classification Search ............... 709/203, 709/219, 227, 228, 229
See application file for complete search history.

(56) References Cited

U.S. PATENT DOCUMENTS

| | | | | |
|---|---|---|---|---|
| 5,825,890 | A * | 10/1998 | Elgamal et al. | 713/151 |
| 5,994,823 | A * | 11/1999 | Okamura et al. | 313/25 |
| 2002/0023143 | A1 * | 2/2002 | Stephenson et al. | 709/218 |
| 2002/0099957 | A1 * | 7/2002 | Kramer et al. | 713/201 |
| 2002/0138553 | A1 * | 9/2002 | Binder | 709/203 |
| 2003/0055982 | A1 * | 3/2003 | Noro et al. | 709/227 |
| 2004/0024879 | A1 * | 2/2004 | Dingman et al. | 709/227 |
| 2004/0044776 | A1 * | 3/2004 | Larkin | 709/228 |
| 2004/0199574 | A1 * | 10/2004 | Franco et al. | 709/201 |
| 2005/0015594 | A1 * | 1/2005 | Ashley et al. | 713/168 |
| 2005/0201370 | A1 * | 9/2005 | Poyhonen et al. | 709/245 |
| 2005/0256806 | A1 * | 11/2005 | Tien et al. | 705/64 |

OTHER PUBLICATIONS

Network Working Group Request for Comments: 1918 Obsoletes: 1627, 1597 BCP: 5 Category: Best Current Practice, Y. Rekhter Cisco Systems B. Moskowitz Chrysler Corp. D. Karrenberg Ripe NCC G.J. De Groot Ripe NCC E. Lear Silicon Graphics, Inc. Feb. 1996.

Network Working Group Request for Comments: 2068 Category: Standards Track, R. Fielding UC Irvine J. Gettys J. Mogul DEC H. Frystyk T. Berners-Lee MIT/LCS Jan. 1997.

Network Working Group Request for Comments: 3022 Obsoletes: 1631 Category: Informational, P. Srisuresh Jasmine Networks K. Egevang Intel Corporation Jan. 2001.

RFC 821 Simple Mail Transfer Protocol, Jonathan B. Postel Information Sciences Institute University of Southern California 4676 Admiralty Way Marina del Rey, California 90291 (213)822-1511 Aug. 1982.

Applicants' statement describing a variety of known communication protocols, May 5, 2003.

* cited by examiner

*Primary Examiner*—Phuoc H Nguyen
(74) *Attorney, Agent, or Firm*—Michael A. Glenn; Glenn Patent Group

(57) ABSTRACT

Network nodes engage in an asymmetric transactional session. The nodes negotiate transactional role reversal and further communication under a reversed asymmetric transactional session.

10 Claims, 15 Drawing Sheets

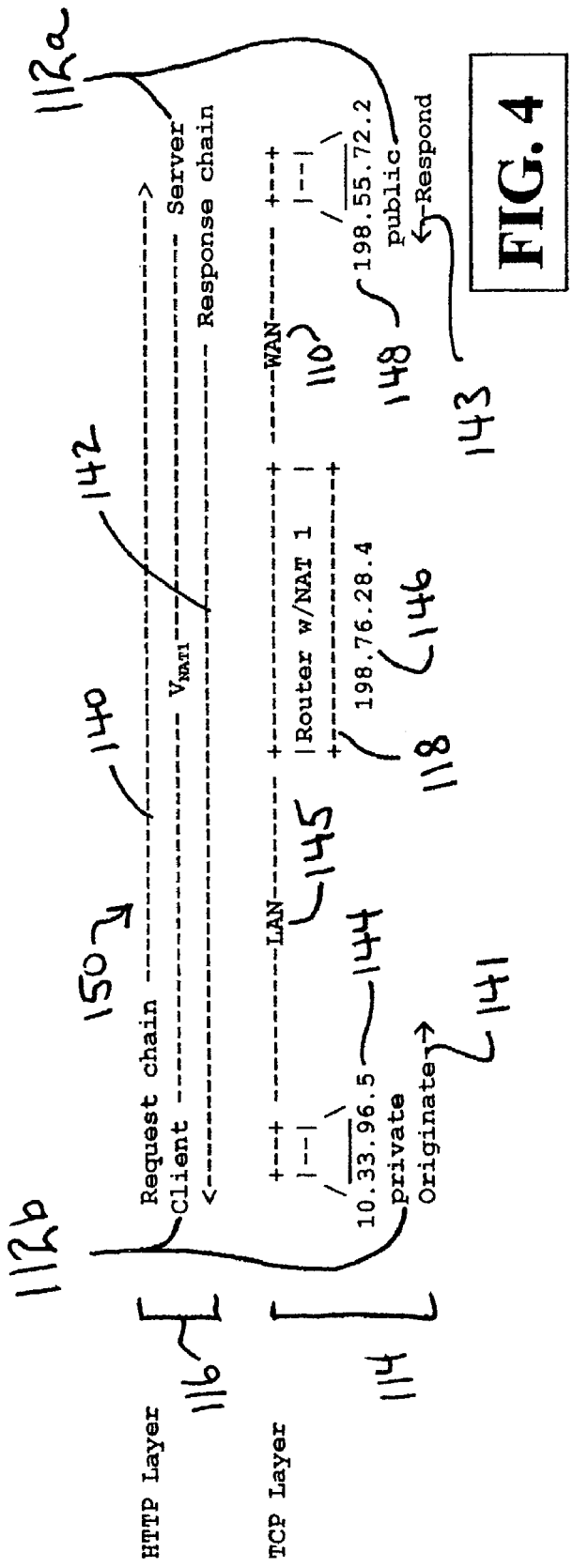
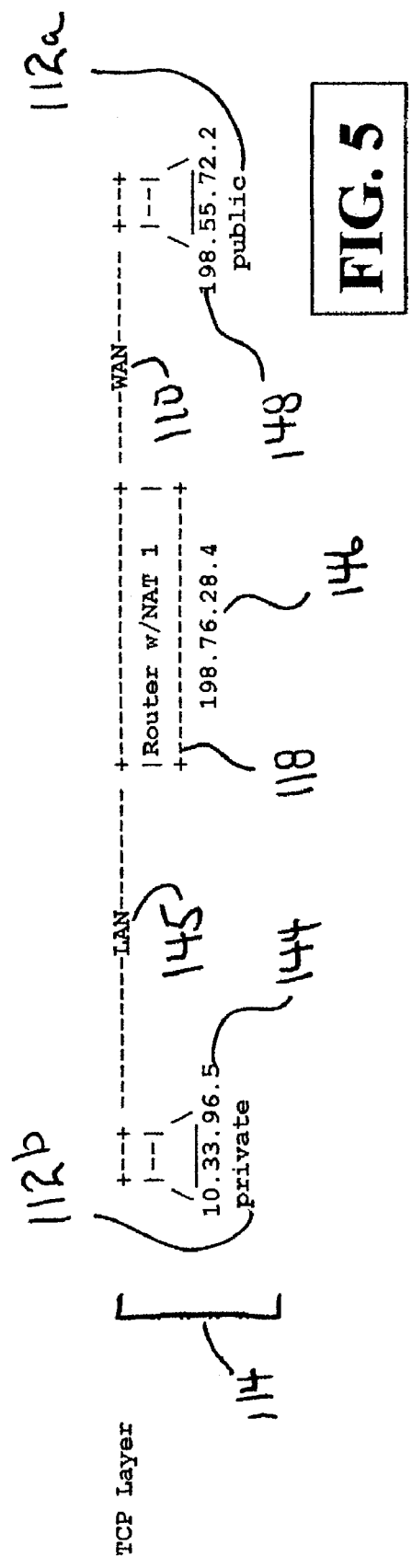
FIG. 4
FIG. 5

412b ⌒<TCP>OUTHINK-PDX   darrell   TCP  64602 > https [SYN]
412a ⌒<TCP>darrell      OUTHINK-PDX  TCP  https > 64602 [SYN, ACK]
412b ⌒<TCP>OUTHINK-PDX   darrell   TCP  64602 > https [ACK]

FIG. 11

412b ⌒ ⎡ <TCP>OUTHINK-PDX   darrell   SSL   Continuation Data
                                                                        <HTTP>POST /servlet/NetworkMessageServlet HTTP/1.1
                                                                 Host: 63.230.174.195:443
                                                                 Connection: Keep-Alive, TE
                                                                 TE: trailers, deflate, gzip, compress
                                                                 User-Agent: RPT-HTTPClient/0.3-2
                                                                 TACT:
                                                                 Accept-Encoding: deflate, gzip, x-gzip, compress, x-compress
                                                                 Content-type: application/octet-stream
                    ⎣ Content-length: 278

412a ⌒ ⎡ <TCP>darrell      OUTHINK-PDX  SSL   Continuation Data
          ⎣ <HTTP>HTTP/1.1 100 Continue 412b ⌒ ⎡ <TCP>OUTHINK-PDX   darrell   SSL   Continuation Data
          ⎣     <HTTP APPLICATION DATA>

FIG. 12

412a ⌒ ⎡ <TCP>darrell      OUTHINK-PDX  SSL   Continuation Data
            <HTTP>HTTP/1.1 200 OK
                Date: Thu, 24 Oct 2002 21:19:20 GMT
                Server: Jetty/3.0 (Windows 2000 5.0 x86)
                Servlet-Engine: Jetty/3.0 (JSP 1.1; Servlet 2.2; java 1.4.0_01)
                Content-length: 290
                TACT: DFLIP
          ⎣    <HTTP APPLICATION DATA>

412b ⌒ ⎣ <TCP>OUTHINK-PDX   darrell   TCP   64602 > https [ACK]

FIG. 13

412a
```
<TCP>darrell     OUTHINK-PDX   SSL   Continuation Data
<HTTP>POST /servlet/NetworkMessageServlet HTTP/1.1
    Host: 63.230.174.197:64602
    Connection: Keep-Alive, TE
    TE: trailers, deflate, gzip, compress
    User-Agent: RPT-HTTPClient/0.3-2
    TACT:
    Accept-Encoding: deflate, gzip, x-gzip, compress, x-compress
    Content-type: application/octet-stream
    Content-length: 348
    <HTTP APPLICATION DATA>
```

412b
```
<TCP>OUTHINK-PDX   darrell   SSL   Continuation Data
<HTTP>HTTP/1.1 200 OK
    Date: Thu, 24 Oct 2002 21:35:25 GMT
    Server: Jetty/3.0 (Windows 98 4.10 x86)
    Servlet-Engine: Jetty/3.0 (JSP 1.1; Servlet 2.2; java 1.4.0)
    Content-length: 347
    TACT:
    <APPLICATION DATA>
```

412a
```
<TCP> darrell     OUTHINK-PDX   TCP   https > 64602 [ACK]
```

FIG. 14

412a ⎧ <TCP>darrell OUTHINK-PDX SSL Continuation Data
   <HTTP>POST /servlet/NetworkMessageServlet HTTP/1.1
    Host: 63.230.174.197:64602
    Connection: Keep-Alive, TE
    TE: trailers, deflate, gzip, compress
    User-Agent: RPT-HTTPClient/0.3-2
    TACT:
    Accept-Encoding: deflate, gzip, x-gzip, compress, x-compress
    Content-type: application/octet-stream
    Content-length: 513
    <HTTP APPLICATION DATA>

412b ⎧ <TCP>OUTHINK-PDX darrell SSL Continuation Data
   <HTTP>HTTP/1.1 100 Continue 412a ⎧ <TCP>darrell OUTHINK-PDX SSL Continuation Data
   <HTTP><APPLICATION DATA>

412b ⎧ <TCP>OUTHINK-PDX darrell SSL Continuation Data
   <HTTP>HTTP/1.1 200 OK
    Date: Thu, 24 Oct 2002 21:39:22 GMT
    Server: Jetty/3.0 (Windows 98 4.10 x86)
    Servlet-Engine: Jetty/3.0 (JSP 1.1; Servlet 2.2; java 1.4.0)
    Content-length: 0

412a <TCP>darrell OUTHINK-PDX TCP https > 64602 [ACK]

FIG. 15

SYMMETRICAL BI-DIRECTIONAL COMMUNICATION

BACKGROUND OF THE INVENTION

HyperTextTransferProtocol (HTTP), e.g., RFC 2616 HTTP/1.1 June 1998, makes a desirable communication protocol because it is well understood, well documented, proven robust, and it is flourishing. A communication method operating under HTTP finds compatibility with existing standards such as the following HTTP extensions: Simple Object Access Protocol (SOAP), eXtensible Markup Language (XML), Distributed Authoring and Versioning (DAV), Web Services Description Language (WSDL), Universal Description Discovery & Integration (UDDI), as well as security standards such as Secure HTTP (S-HTTP), and other standards likely to emerge to extend existing web client browsers and servers providing HTTP communication. These extensions to HTTP are confined by and limited to the asymmetries of HTTP as discussed more fully hereafter. HTTP protocol and its extensions will likely enjoy continued success by sheer volume of use and momentum of use as the dominant method of communication on, for example, the Internet.

HTTP transactions, or sessions, consist of a series of requests and responses. A session originates with a client request and concludes with a server response. A variety of additional rules dictate the sequence of transactional interchange occurring in an HTTP session. Overall, however, HTTP sessions follow a client request and server response transaction scenario. A session can terminate following completion of an HTTP transaction sequence, or after a timeout period in the event of no server response. A KEEP ALIVE request from the client may increase a given session timeout period by requesting that server not terminate the connection. However, once a transaction is completed the server is not obligated to maintain the connection.

By nature, an HTTP session is transactional, e.g., exists for, and substantially only during, a given transaction scenario. Furthermore, the relationship is highly asymmetrical, e.g., the client dictates the time of initiating each session. The server has no such ability.

The HTTP protocol has been implemented generally over the TCP/IP network protocol. As such, TCP/IP provides an underlying transport connection between HTTP client and server including network node addressing and data packet exchange. The TCP/IP network protocol has proven itself an enormous success as applied not only in a global network application, e.g., the Internet, but also across a wide spectrum of private networks. TCP/IP constitutes by sheer volume of use and momentum a virtually universal mode of interaction between users and computing devices operated by such users.

The TCP/IP network address space is generally partitioned into a single public address space and numerous private address spaces connected to this public address space by means of Network Address Translation or proxy servers. A typical TCP/IP connection traverses not only public/private address space boundaries but multiple organizational jurisdictions, encountering different equipment configurations, bandwidth management policies and security policies implemented in hardware and software, all of which must be successfully negotiated at the TCP/IP layer for the overlaying HTTP or other protocol to be successful in establishing and maintaining end-to-end communication.

Because of the nature of TCP/IP networks described above, there is a fundamental problem to be solved for applications that desire to take advantage of HTTP and its extensions to negotiate the labyrinth of network jurisdictions and permissions, while treating all network nodes as functional peers. Under HTTP, participating network nodes play asymmetric roles where one, the client, initiates a conversation by making a request and the other, the server, responds. Common understanding of the HTTP protocol suggests a public node, e.g., having a published or known, routable network address, is always the server, while a private node, e.g., having a generally unknown and/or unpredictably dynamic local network address, is generally the client. The client polls the server with requests and the server responds. The two nodes do not act as functional peers. The server node cannot initiate a spontaneous request and a client node cannot receive a spontaneous request.

Thus, as the Internet has developed, certain roles have evolved rigidly and asymmetrically with respect to HTTP communication. Certain computing devices assume exclusively the role of "server" and receive requests for information, e.g., documents maintained under the HTTP protocol, and other devices assume exclusively the role of "client" and request such documents. Under such evolution, therefore, HTTP communication has evolved in an asymmetrical fashion with respect to the underlying TCP/IP network, which is generally symmetrical. More particularly, clients request information from servers and servers provide, when possible, the requested information. A device assumes a "server" role and does not initiate communications, but rather stands ready and accessible to others sending requests thereto. A server does not initiate HTTP communication with a client. For this reason, HTTP communication between a server and a client is limited to those communications initiated by a client, i.e., initiated by a request originating from a client and directed toward a particular server.

This strong correlation of the role of devices with the asymmetrical HTTP model has also become fixed in network hardware, software and corporate network security policies. When two or more nodes do not share a common Internet address space, they encounter Network Address Translation, or proxying, both of which typically depend upon the private address device being the client and the public address device being the server. Security restrictions, in the form of firewalls, deployed at one or more routers operating between nodes, typically enforce similar asymmetries, rendering useful symmetrical bi-directional HTTP communication unavailable.

Thus, the Internet is built around the asymmetrical private client-public server description of HTTP. In practice heretofore, a peer-based model of communicating on the Internet was likely blocked from using HTTP and its extension and likely blocked from taking advantage of all the benefits surrounding it.

Asymmetrical HTTP communication in both directions has been addressed, but it is inefficient and unsuitable for peer-based networks. For example, a "polling" method of HTTP communication has been proposed where a client intermittently asks or polls a server, the client inquiring whether or not the server needs to communicate with the client. Under this arrangement, the server does not initiate communications, but rather waits for a request from a client. This request opens communications and permits the server to provide any pending communication to the client. For example, HTTP GET and PUT commands facilitating bi-directional file exchange between the client and server can then commence.

Polling for information on the server undesirably wastes network bandwidth. Most requests will evoke a null response. Given a peer-based network topology providing many-to-many peer connections, and multiplying the number of nodes by the number of connections by the number of different types of requests likely to be generated by each peer, a polling solution does not scale into a useable model. An overwhelming amount of network traffic consists of request-response pairs characterized by: "Now? No!". More importantly, because server nodes cannot initiate connections with client nodes under HTTP, a peer-based network based upon HTTP would require that all client nodes always poll all server nodes to maintain complete network connectivity, incurring the worst-case bandwidth penalty described above.

Thus, as server and client roles evolved and the use of HTTP communication therebetween grew rapidly, symmetrical communication between entities operating on, for example, the Internet has been limited. It would be desirable, therefore, to provide improved symmetrical communication compatible with the HTTP protocol. The subject matter of the present invention provides such symmetrical communication.

SUMMARY OF THE INVENTION

Network nodes engage in an asymmetric transactional session. The nodes negotiate transactional role reversal and further communication under a reversed asymmetric transactional session.

The subject matter of the present invention is particularly pointed out and distinctly claimed in the concluding portion of this specification. However, both the organization and method of operation of embodiments of the present invention, together with further advantages and objects thereof, may best be understood by reference to the following description taken with the accompanying drawings wherein like reference characters refer to like elements.

BRIEF DESCRIPTION OF THE DRAWINGS

For a better understanding of embodiments of the present invention, and to show how the same may be carried into effect, reference will now be made, by way of example, to the accompanying drawings in which:

FIG. 4 through FIG. 7 illustrate a sequence of events occurring in establishing communication according to an embodiment of the present invention.

FIG. 11 through FIG. 15 illustrate dialog exchanged between a pair of computer nodes establishing communication according to an embodiment of the present invention.

DETAILED DESCRIPTION

The illustrated embodiments of the present invention follow a method for enabling symmetrical bi-directional communication between network nodes. The illustrated embodiments include such communication between network nodes generally, and include such communication between non-contiguous TCP/IP address spaces. In the illustrated embodiments of the present invention, extensions of HTTP protocol facilitate symmetrical bi-directional communication. The illustrated embodiments of the present invention enable symmetrical bi-directional communication without relying on a polling method, i.e., without requiring an entity operating in its "client mode" to intermittently ask another entity operating in its "server mode" whether or not such "server mode" entity has information to provide to the "client mode" entity.

Symmetric bi-directional communication finds utility in, for example, software applications for peer-to-peer communication between networked computers using Internet HTTP protocol and extensions thereof.

Illustrated embodiments of the present invention provide a dynamic, secure, network topology of client-servers, dynamically connecting and disconnecting and whose transactional roles change as they consume, supply or relay data. A compliant extension to HTTP, e.g., compliant with existing standards and practices, supports implementation of embodiments of the present invention by supporting HTTP transaction role reversal.

Figure 1:
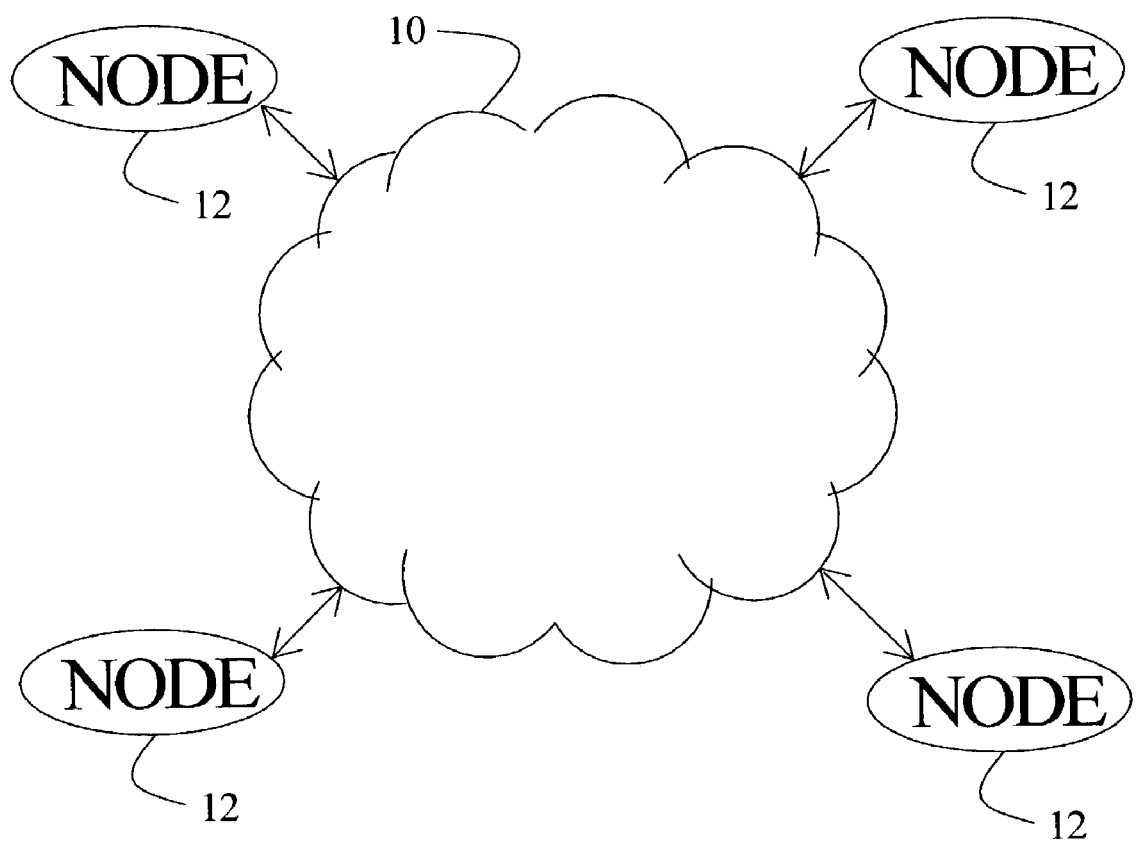
FIG. 1 illustrates a population of computer network nodes coupled by network and communicating according to an embodiment of the present invention.

FIG. 1 illustrates generally operation of an embodiment of the present invention including a schematic illustration of a TCP/IP network 10 and a population of nodes 12 interconnected thereby. While illustrated in FIG. 1 as a population of four nodes 12, in practice a vast number of nodes 12 connect concurrently by way of network 10. Network 10 can be a global network such as the Internet, a wide area network (WAN), a local area network (LAN), or a combination thereof. One or more of nodes 12 may operate as a private node coupled to network 10 with suitable network address translation (NAT) relative to its private or local area network (LAN) address. Thus, nodes 12 can be private or public nodes. The term "node" can refer to persons or computing devices coupled via network 10 for interaction by a variety of protocols. The term "node" can also refer to a computing device acting autonomously and programmed to interact with other devices or persons coupled to network 10.

Traditionally, TCP/IP network nodes communicating via HTTP protocol assume one of two roles exclusively. A network node can be a "HTTP client" or can be a "HTTP server" whereby under such roles each node would, generally, request information and dispense information, respectively. As such, bi-directional communication has been limited to such asymmetrical information requesting and information dispensing HTTP transaction sessions. Nodes operating in a "HTTP server" mode of operation do not have opportunity to initiate interaction with another node operating in a "HTTP client" mode of operation.

Nodes 12, however, initially acting as "clients" can operate also as "servers" when participating in an HTTP session across a flipped session and across a peered connection as described more fully hereafter. Nodes 12 can assume concurrently, e.g., by separate programming agents or cooperatively in a common hybrid programming agent, a "server" role and a "client" role in establishing symmetrical bi-directional HTTP communication, or peered connection, according embodiments of the present invention described herein.

Thus, FIG. 1 illustrates a collection or population of nodes 12, individually nodes 12a-12d, interconnected by way of TCP/IP network 10. In accordance with one embodiment of the present invention a first node 12 initiates an HTTP session with a second node 12. As a result, an underlying network connection, e.g., a TCP/IP socket or circuit is established coupling the first and second nodes and an HTTP layer or session overlies this network connection. The HTTP session includes negotiation between the first and second nodes 12 to reverse HTTP roles. In implementing such a reversal, the initial HTTP session terminates, but the underlying network connection remains. Each node 12 then assumes an opposite transactional role in a new HTTP session supported by the original underlying network connection.

The second node 12, e.g., the original "server-mode" node 12, now acts as a client with respect to the first node 12. The original TCP/IP circuit remains as a symmetrical underlying end-to-end network connection. The new or "flipped" HTTP session references the original network connection, but reverses the HTTP roles for the first and second nodes 12. The original "server-mode" or second node 12 now-has a client-capability of initiating requests in the flipped HTTP session, e.g., can initiate HTTP requests directed toward the original "client-mode" or first node 12. An additional HTTP session can be created where the original client-mode node 12 enacts a client role and the original server-mode node 12 enacts a server role, e.g., similar to the first HTTP session. A pair of oppositely-directed HTTP sessions thereby couple the participating nodes and together establish symmetry, e.g., a peered connection. Furthermore, and according to certain aspects of embodiments of the present invention, either node 12 can now initiate, or request initiation of additional HTTP sessions, as required, e.g., to engage in multiple, simultaneous file transfers in both directions.

Each of nodes 12 can operate with complementary HTTP roles in different HTTP sessions. Cooperative use of the oppositely directed HTTP sessions allows each of the participating nodes 12 to initiate and request HTTP transactions in symmetrical bi-directional communication therebetween.

In one normally-directed HTTP session, for example, the original "client-mode" or first node 12 couples as client to the original "server-mode" or second node 12 whereby transactions are initiated by the original "client-mode" or first node 12. In the flipped or reverse-role HTTP session, however, the original "server-mode" or second node 12 uses the original TCP/IP circuit information in a client capacity to address the original "client-mode" or first node 12 in a server capacity whereby the original "server-mode" or second node 12 initiates HTTP sessions. Each of nodes 12 can participate in a pair of HTTP sessions, one reversed and the other normally directed. Together the pair of HTTP sessions provides symmetric bi-directional communication therebetween.

As implemented under TCP/IP protocol, network 10 facilitates for each of nodes 12 a network node or IP address. In some cases, nodes 12 constitute "private" nodes in which the IP address is not generally publicly available or is generally only available dynamically and indirectly through a network address translator (NAT) enabled router or other such proxy device making available communication relative to a "private address space." Thus, each node 12 by means of its corresponding IP address may be contacted and may contact other nodes 12 in similar fashion and in some cases an intervening address translation, e.g., by a NAT-enabled router, lies along the communication path.

The use of private IP addresses relative to public IP addresses, and the use of intervening NAT routers can be considered under embodiments of the present invention. More particularly, according to embodiments of the present invention, symmetrical bi-directional communication can be established between a private node 12, e.g., one operating on a local area network (LAN) within a private address space, and a public node 12, e.g., a node 12 having a known or published network address.

The origins of private address spaces, which were not a part of the original Internet, are found in the rules governing public and private address spaces on the Internet as described in Address Allocation for Private Internets, RFC 1918, February 1996:

> With the proliferation of TCP/IP technology worldwide, including outside the Internet itself, an increasing number of non-connected enterprises use this technology and its addressing capabilities for sole intra-enterprise communications, without any intention to ever directly connect to other enterprises or the Internet itself.
>
> The Internet has grown beyond anyone's expectations. Sustained exponential growth continues to introduce new challenges. One challenge is a concern within the community that globally unique address space will be exhausted.

RFC 1918 sought to use the existing range more efficiently. It set aside three specific blocks of addresses for machines that communicated mostly with each other, on private networks, behind a router, switch or firewall that separated their local TCP/IP address space from the public address space of the Internet at large.

RFC 1918 [3] states:

> The Internet Assigned Numbers Authority (IANA) has reserved the following three blocks of the IP address space for private Internets:

| | |
|---|---|
| 10.0.0.0 | 10.255.255.255 (10/8 prefix) |
| 172.16.0.0 | 172.31.255.255 (172.16/12 prefix) |
| 192.168.0.0 | 192.168.255.255 (192.168/16 prefix) |

> ... Addresses within this private address space will only be unique within the enterprise, or the set of enterprises which choose to cooperate over this space so they may communicate with each other in their own private Internet.
>
> ... Private hosts can communicate with all other hosts inside the enterprise, both public and private. However, they cannot have IP connectivity to any host outside of the enterprise. While not having external (outside of the enterprise) IP connectivity private hosts can still have access to external services via mediating gateways (e.g., application layer gateways).

What RFC 1918 terms "... access to external services," for the real world was defined in Traditional IP Network Address Translator (Traditional NAT) RFC 3022, January 2001 and usually called, simply, NAT RFC 3022 [1] states:

> Basic Network Address Translation or Basic NAT is a method by which IP addresses are mapped from one group to another, transparent to end users. Network Address Port Translation, or NAPT is a method by which many network addresses and their TCP/UDP (Transmission Control Protocol/User Datagram Protocol) ports are translated into a single network address and its TCP/UDP ports. Together, these two operations, referred to as traditional NAT, provide a mechanism to connect a realm with private addresses to an external realm with globally unique registered addresses.

A NAT compliant router establishes communications sockets $V_{NAT}$ for the TCP/IP layer whose outbound traffic appear to public address spaces as emanating from a public address, but which routes return messages to the private address from which the request emanated. NAT is inherently asymmetrical—the initial request must emanate from the private address space.

RFC 3022 [2] unambiguously states:

In a traditional NAT, sessions are unidirectional, outbound from the private network.

Inbound connections are not allowed under NAT. In other words, an HTTP session cannot be initiated inbound, e.g. a public client cannot address a private server. NAT does not assume, however, the existence of roles beyond the handshake sequence for originating the circuit. A TCP/IP circuit, or $V_{NAT}$, once established, can be symmetrical and bi-directional, and in fact places no further restrictions on either the originating or the responding node. Enforcement of other protocol-related roles or symmetry, if any, once the underlying TCP/IP network connection has been established, is solely a function of the overlying protocol layer.

Once an underlying network connection has been established, therefore, existing NAT standards place no restriction on reversing HTTP transaction roles. A pair of oppositely directed HTTP layers can establish a symmetrical, bi-directional communication relationship between a private node 12 and a public node 12.

Figure 2:
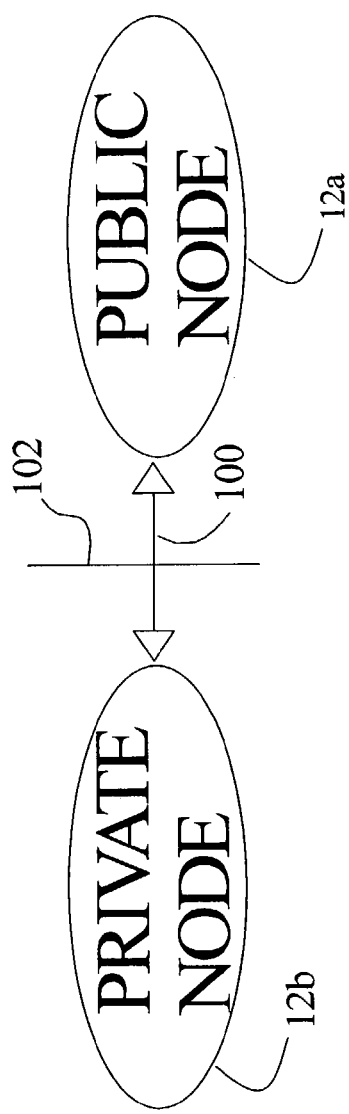
FIG. 2 illustrates a private address node and a public address node communicating according to an embodiment of the present invention.

FIG. 2 illustrates a case where a private node successfully implements symmetrical bi-directional communication with a public node. More particularly, FIG. 2 illustrates a peered connection 100 between a pair of nodes 12, node 12a as a public node and 12b as a private node. Peered connection 100 includes a pair of oppositely directed HTTP sessions. Peered connection 100 operates across a public/private boundary 102. Peered connection 100 may be established by a private node, e.g., node 12b, initiating a HTTP session and associated TCP/IP network connection. Nodes 12a and 12b negotiate peered connection 100 following establishment of an HTTP connection by node 12b and acquiescence by the other node, 12a, to 'flip' or reverse roles. Following such negotiation, each of nodes 12a and 12b terminate the existing HTTP session, but maintain the underlying TCP/IP network connection.

The underlying TCP/IP network connection thereafter supports a reverse-directed HTTP session, e.g., with HTTP transaction roles for nodes 12a and 12b reversed relative to the first HTTP session. For example, private node 12b operates in a server capacity and public node 12a operates in a client capacity.

Node 12b then initiates an additional normal-directed HTTP session, e.g., with HTTP transaction roles aligned relative to the first HTTP transaction, to complete peered connection 100. For example, private node 12b enacts a client role and public node 12a enacts a server role.

By coordinating such one or more oppositely-directed HTTP layers, e.g., including one or more layers having reverse-directed roles and one or more layers having normally-directed roles, fully symmetrical bi-directional communication results.

Symmetrical bi-directional communication may be established between two private nodes under illustrated embodiments of the present invention.

Figure 3:
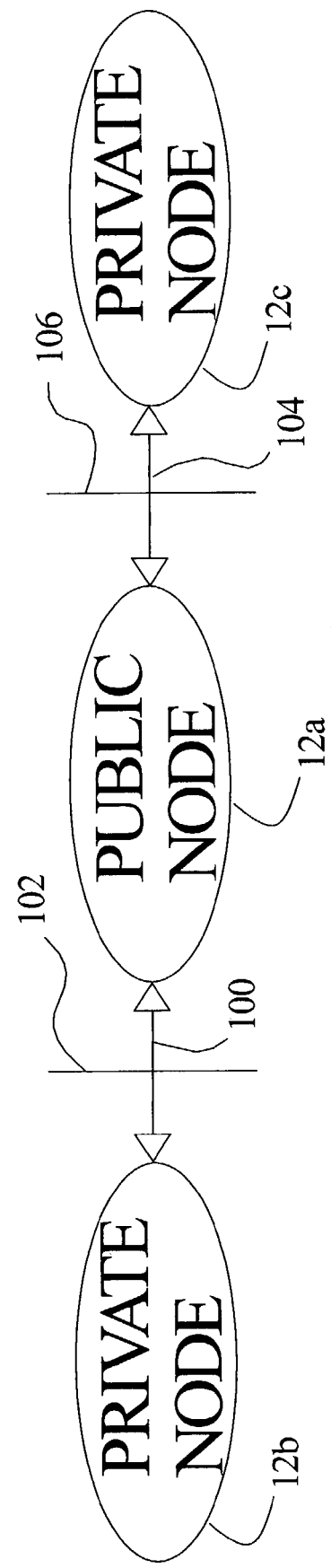
FIG. 3 illustrates a pair of private address nodes communicating through a public address node intermediary according to an embodiment of the present invention.

In FIG. 3, two peered connections, individually 100 and 104, interconnect private nodes 12b and 12c, respectively, to a public node 12a. Public node 12a serves as a public proxy relay for peered connections 100 and 104. Peered connections 100 and 104 each includes a pair of oppositely directed HTTP sessions. A symmetrical bi-directional connection between private node 12b and private node 12c is thereby facilitated, e.g., by way of public node 12a. More particularly, private node 12b establishes a first symmetrical bi-directional peered connection 100 across public/private boundary 102 and with public node 12a. Private node 12c establishes a peered connection 104 across public/private boundary 106 and with public node 12a. Public node 12a, suitably programmed as a proxy relay, facilitates communication between nodes 12b and 12c in symmetrical bi-directional fashion and according to HTTP protocol. In this manner, peered connections 100 and 104, as supported by public node 12a acting as a transparent relay, symmetrically couple nodes 12b and 12c.

FIG. 4 illustrates an HTTP session as supported by an underlying TCP/IP network transport connection and illustrates a starting point for an embodiment of symmetrical bi-directional communication between a public node 112a and private node 112b. FIG. 4 illustrates one example starting point for implementation of symmetrical communication as illustrated more generally in FIG. 2.

In FIG. 4, node 112a initially plays a server transactional role and node 112b initially plays a client transactional role. An underlying TCP/IP network transport layer 114 enables addressing at nodes 112a and 112b, e.g., each of nodes 112a and 112b has an address under TCP/IP networking protocol. An HTTP layer 116 supports an HTTP session as described more fully hereafter. Thus, node 112b has a private address 144 on a local area network (LAN) 145 and node 112a has a public address 148 on a wide area network (WAN) 110, e.g., node 12a has a public address 148 on the Internet. Each of nodes 112a and 1112b communicates with the other via HTTP and a router 118 with public address 146. Router 118 uses, for example, Network Address Translation (Traditional IP Network Address Translator (Traditional NAT) RFC 3022, January 2001).

HTTP sessions typically open with symmetries of the HTTP layer and the NAT routing of the TCP layer aligned in a common direction. In other words, HTTP sessions typically begin with the TCP layer 114 originate-to-respond direction 141 or NAT origination designation 141 aligned with the HTTP layer 116 request chain direction 140 and begin with the TCP layer 114 respond-to-originate direction 143 or NAT respond designation 143 aligned with the HTTP layer 116 response chain direction 142. At this point, HTTP layer 116 presents such alignment.

Thus, NAT origination designation 141 always begins in the private address space, and supports establishing a routing table in the NAT device. The routing table maps a routing circuit, e.g., $V_{NAT}$, for HTTP responses in the direction 143 from a public node back to the private originator. However, once this map is created, and a circuit, $V_{NAT}$, established, the notions of originator and responder no longer apply. The NAT device symmetrically applies the routing map established for the $V_{NAT}$ circuit. The $V_{NAT}$ circuit itself is a TCP/IP socket, which has no inherent directionality.

HTTP layer 116, however, assumes that all transactions begin with a node 112b request along request chain direction 140 and are completed by a node 112a response along response chain direction 142. The network transport TCP/IP layer 114 assumes all network connections originate at the private address 144 of node 112b, with the router 118 assuming responsibility for translating outbound message packets from the private address 144 of node 112b to a valid public address 146 of router 118 to which public node 112a can respond and thereby return responses to the private node 112b.

In accordance with embodiments of the present invention, nodes 112a and 112b negotiate an HTTP transaction role reversal. As illustrated in FIG. 5, following such negotiation, e.g., both nodes 112a and 112b accepting the proposed HTTP role reversal, nodes 112a and 112b terminate, let terminate, or other wise abandon session 150 of HTTP layer 116 as previously lying over TCP layer 114. Nodes 112a and 112b maintain, however, the underlying network connection or $V_{NAT1}$ at TCP layer 114. In other words, public node 112a remains able to address private node 112b by way of router 118 and according to TCP/IP protocol.

Figure 6:
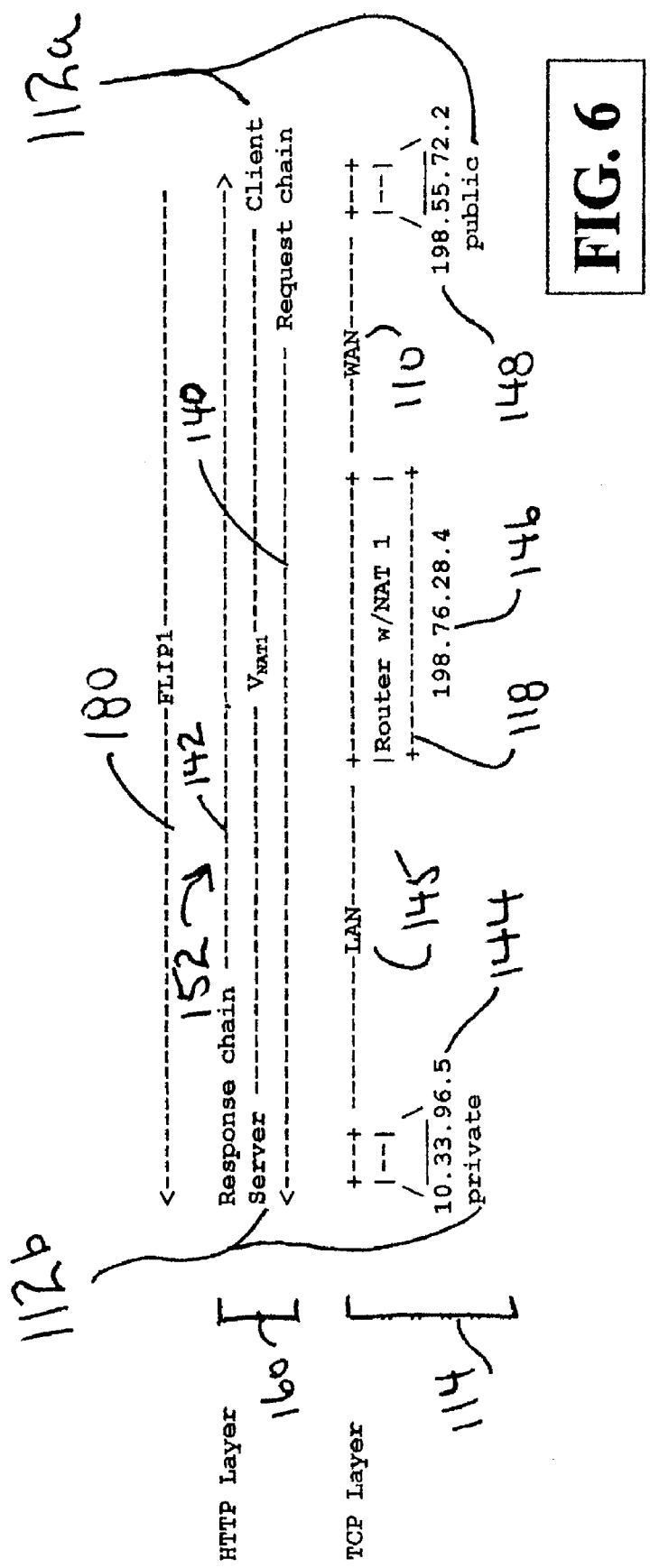

In FIG. 6, a new HTTP session 152 in a new HTTP layer 160 lies over TCP layer 114. In other words, nodes 112a and 112b address one another suitably by way of router 118 according to TCP layer 114 network addressing, e.g., by way of $V_{NAT1}$. HTTP session 152 of HTTP layer 160, however, notably includes node 112a in a client role and node 112b in a server role. By referencing $V_{NAT1}$, HTTP layer 160 lies over the preexisting TCP connection at layer 114. Nodes 112a and 112b establish a reverse-role or FLIP1 connection 180 pointing from node 112a toward node 112b. The directionality of FLIP1 connection 180 as represented in FIG. 6 indicates ability by node 112a to initiate an HTTP session relative to node 112b. In other words, the directionality of FLIP1 connection 180 indicates node 112a providing a client role while node 112b provides a server role.

Figure 7:
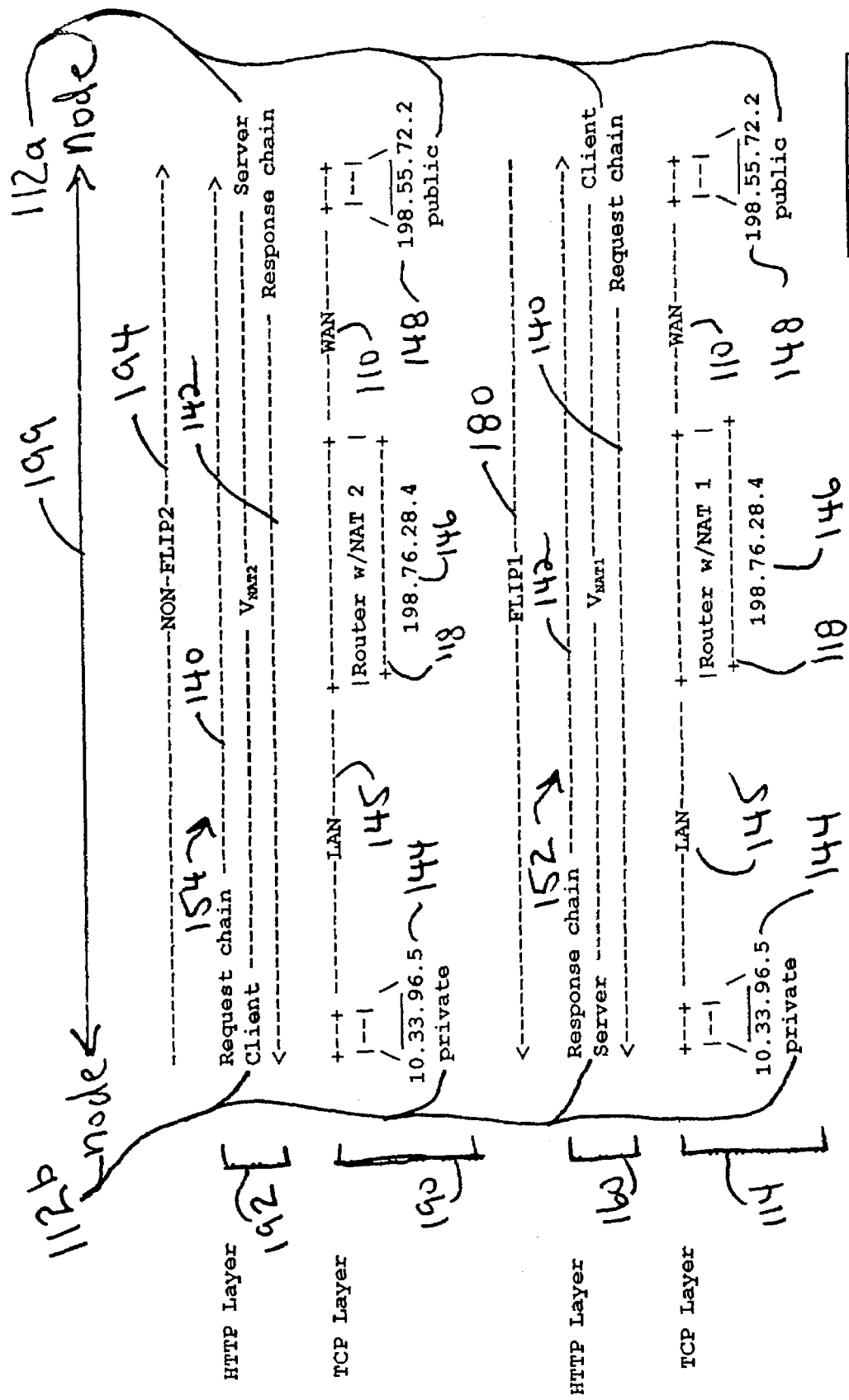

In FIG. 7, the original underlying TCP layer 14 $V_{NAT1}$ connection and reverse-role HTTP session 152 in HTTP layer 160 persist in support of FLIP1 connection 180 where node 12a operates as a client and node 12b as a server.

Node 12b has initiated, however, a new HTTP session 154 in HTTP layer 192. This creates an underlying TCP layer 190 network connection or circuit $V_{NAT2}$ supporting session 154. Session 154 is, therefore, a normally-directed HTTP session, e.g., with node 12b providing a client transactional role and with node 12 providing a server transactional role. Session 154 establishes a NON-FLIP2 connection 194.

Together, FLIP1 connection 180 and NON-FLIP2 connection 194 present opposite asymmetry and, in coordinated use, establish a symmetric bi-directional peered connection 199, e.g., similar to peered connection 100 of FIG. 2 or peered connections 100 and 104 of FIG. 3. Each of nodes 112a and 112b thereby has ability to initiate a request and to satisfy a request by way of peered connection 199, including the ability to establish, or request the establishment of, additional HTTP connections in either direction, as may be required.

Thus, FIG. 7 illustrates a communication method similar to that of FIG. 2 coupling symmetrically and bi-directionally a private node and a public node across a public/private boundary 102. It will be understood, however, that the particular implementation illustrated in FIG. 7 does not limit other implementations available in pursuit of that illustrated in FIG. 2. The embodiment of FIG. 7 is one particular implementation of an embodiment of the present invention.

Figure 8:
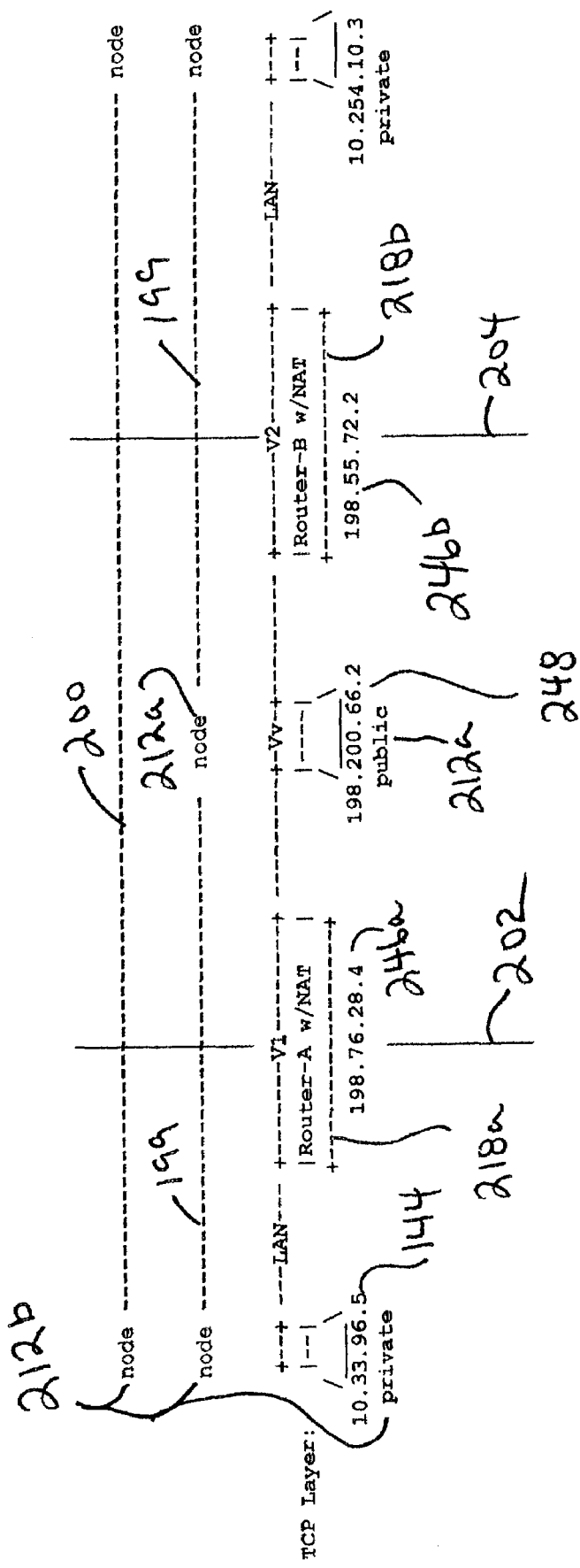
FIG. 8 illustrates communication between a pair of private address nodes with a public address node intermediary according to an embodiment of the present invention.

FIG. 8 illustrates a communication method similar to that of FIG. 3. More particularly, FIG. 8 illustrates symmetrical bi-directional communication between a private node 212a and a private node 212c. A first peered connection 199 couples private node 212b and a public node 212a as described above. In other words, peered connection 199 includes a pair of oppositely directed HTTP sessions together forming a symmetrical, bi-directional communication channel, or peered connection 199, between private node 212b and public node 212a. A second peered connection 199 lies between a second private node 212c and public node 212a. In other words, the second peered connection 199 also includes a pair of oppositely directed HTTP sessions together forming a symmetrical, bi-directional communication channel, or second peered connection 199, between private node 212c and public node 212a.

Public node 212a serves as transparent proxy-relay coupling the first and second peered connections 199 and thereby establishes a private-to-private symmetrical bi-directional peered connection 200 between private nodes 212b and 212c. Connection 200 thereby supports peer-to-peer symmetrical and bi-directional communication application interacting cooperatively thereon and between private nodes 212b and 212c.

Figure 9:
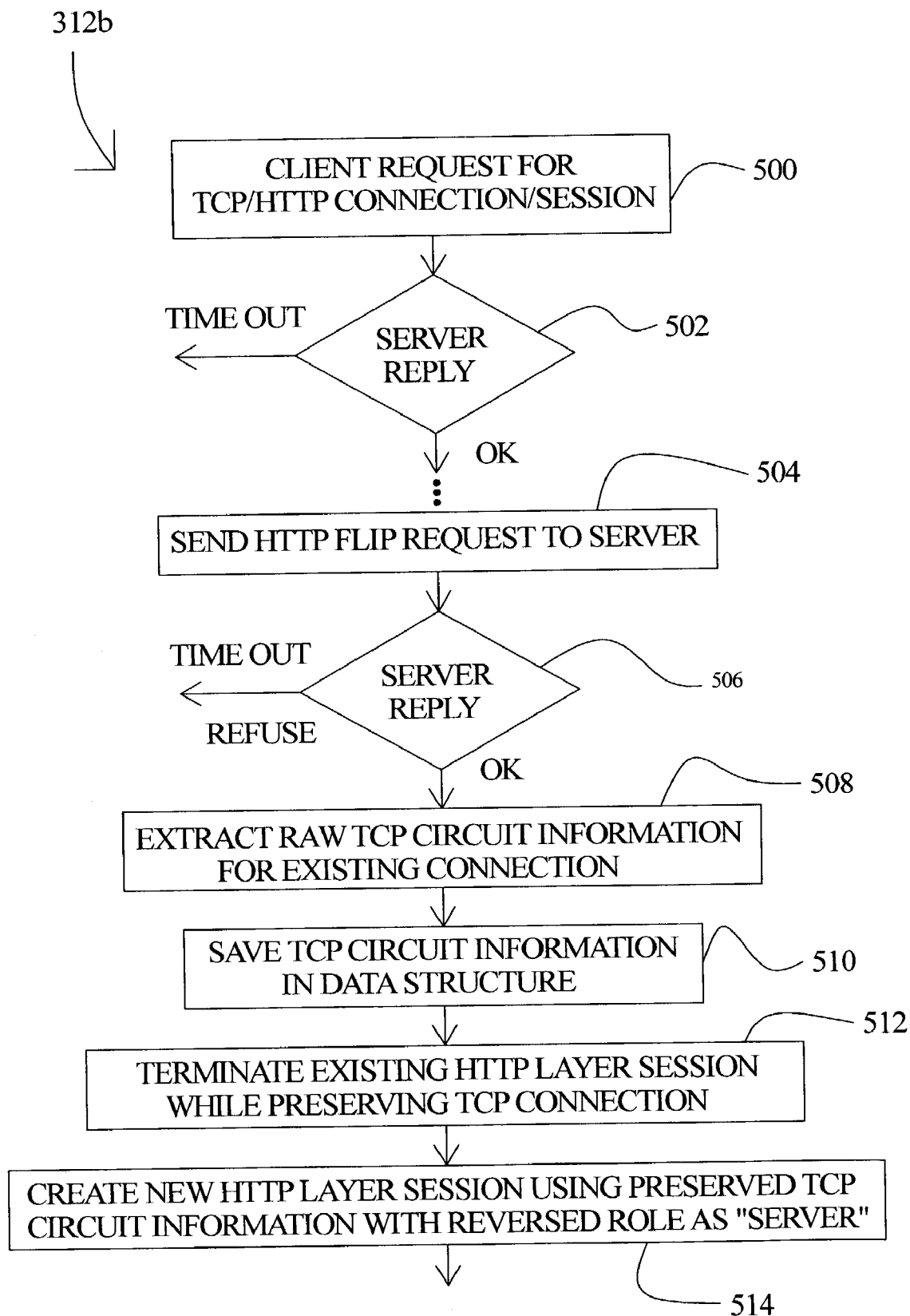
FIGS. 9 and 10 are flowcharts illustrating coordinated interaction between a pair of computer network nodes establishing communication according to an embodiment of the present invention.
Figure 10:
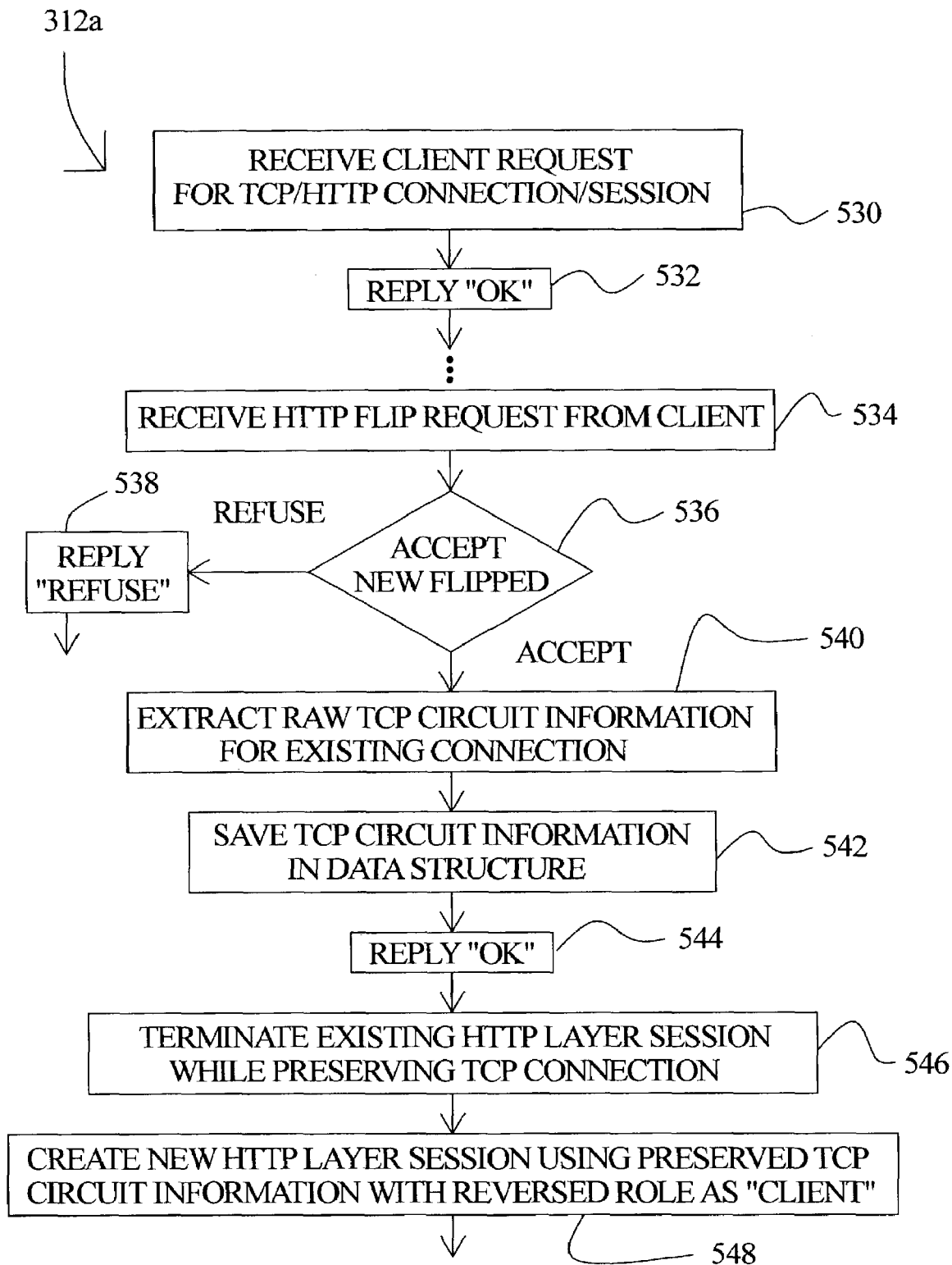

FIG. 9 and FIG. 10 illustrate by flowchart coordinated interaction between a pair of computer nodes communicating according to illustrated embodiments of the present invention. For example, FIG. 9 illustrates program agent 312b operating at a first network node providing at least in part a "server" role and FIG. 10 illustrates a program agent 312a operating at a second network node providing at least in part a "client" role. Under such established asymmetrical transactional roles, at the outset agent 312a operates in a "server" capacity may be contacted through its IP address for purposes of requesting information. For example, agent 312a may be executing on a "public" node having its IP address available to any entity, e.g., a node executing agent 312b, wishing to address agent 312a by way of network protocol. Agent 312b serving in a "client" mode of operation, can request information from agent 312b because the IP address for agent 312a is known to agent 312b. Agent 312b thereby has opportunity to initiate communication with agent 312a.

In FIG. 9, agent 312b initiates communication by sending a request to agent 312a for a TCP/IP connection and HTTP session in block 500. Turning to FIG. 10, agent 312a receives the request from agent 312b in block 530. In response, agent 312a in block 532 sends a reply "OK" to agent 312b. In FIG. 9, agent 312b, pending a reply from agent 312a at decision block 502, upon receiving the "OK" from agent 312a advances from decision block 502. Decision block 502 also provides a TIME OUT branch for agent 312b in the event that agent 312a does not reply to the agent 312b request for a TCP/HTTP connection/session. At this point, a TCP/HTTP connection/session similar to that of FIG. 4 has been established.

Agent 312a operates in a "server" mode and agent 312b operates in a "client" mode and whereby agent 312b requests information, e.g., HTTP-based documents, and agent 312b responds by sending requested information to the IP address for agent 312b. As such, however, agent 312a does not yet have opportunity to initiate an HTTP request for information from agent 312b.

Agent 312b in block 504 begins establishing a bi-directional communication channel with agent 312a by sending an HTTP FLIP request to agent 312a. As may be appreciated, agent 312a includes programming established to recognize the HTTP FLIP request. A variety of mechanisms may be employed to deliver and recognize an HTTP FLIP request. For example, agent 312b can include such HTTP FLIP request in a request chain and agent 312a can be programmed to look for and respond to an HTTP FLIP request therein. It will be understood, however, that a variety of mechanisms may be employed to communicate such request between agent 312*b* and agent 312*b*. An HTTP FLIP request shall not be limited to that illustrated under various embodiments of the present invention. Agent 312*b* then waits at decision block 506 pending reply to the HTTP FLIP request sent to agent 312*a*. Decision block 506 includes a TIME OUT or REFUSE branch should agent 312*a* either not respond to the HTTP FLIP request or expressly refuse in a return communication the HTTP FLIP request.

In FIG. 10, at block 534, agent 312*a* receives from agent 312*b* the HTTP FLIP request. In decision block 536, agent 312*a* decides whether not to accept the new "flipped" connection. If agent 312*a* decides to refuse the request then processing branches from block 536 to block 538 where agent 312*a* sends a "refuse" message to agent 312*b*. Otherwise, agent 312*a* determines that it will accept the agent 312*b* HTTP FLIP request. Processing then advances to block 540 where agent 312*a* extracts the raw TCP/IP circuit information for the existing network connection. Processing then continues to block 542 where agent 312*a* saves the extracted TCP/IP circuit information in an appropriate data structure. In block 544, agent 312*a* sends an "OK" communication to agent 312*b*.

In FIG. 9, agent 312*b* receives the "OK" communication from agent 312*a* and, advancing to block 508, extracts the raw TCP/IP circuit information from the existing network connection. Continuing to block 510, agent 312*b* saves the TCP/IP circuit information in an appropriate data structure. At this point, both nodes 312*a* and 312*b* have preserved the same TCP/IP circuit information locally and reference such information to maintain further HTTP session communication, e.g., a reverse-role HTTP session such as FLIP1, therebetween.

Having maintained locally the TCP/IP circuit information at both agent 312*a* and agent 312*b*, the existing HTTP layer session can be terminated at both agents 312*a* and 312*b* while preserving the underlying TCP/IP connection as represented in the stored TCP/IP circuit data structure. Thus, in FIG. 10 at block 546 agent 312*a* terminates the existing HTTP layer session while preserving the underlying TCP/IP network connection layer. Similarly, in FIG. 9 at block 512, agent 312*b* terminates the existing HTTP layer session while preserving the underlying TCP/IP network connection layer.

At this point, both agent 312*a* and agent 312*b* have preserved the previously established underlying TCP/IP circuit and created a new HTTP session thereover, but with HTTP transaction roles reversed. Thus, in FIG. 10 at block 448, agent 312*a* creates a new HTTP layer session using the preserved TCP/IP circuit information, but with a reversed role, i.e., operating in a "client" mode of operation. Similarly, in FIG. 9 at block 514 agent 312*b* creates a new HTTP layer using the preserved TCP/IP circuit information, but with a reversed role, i.e., operating in a "server" mode.

At this point, agent 312*a* originally operating in a "server" mode now operates, e.g., with respect to this particular TCP/IP circuit, in a "client" mode while agent 312*b*, originally operating in a "client" mode now operates, e.g., with respect to this particular TCP/IP circuit, in a "server" mode. As such, agent 312*a*, previously unable to request information from agent 312*b*, can now initiate interaction with agent 312*b* acting in its "server" mode relative to the preserved TCP/IP connection.

From a TCP/IP network transport layer perspective, nothing changed. The socket created by the first request call from the private client, e.g., agent 312*b*, to the public server, e.g., agent 312*a*, was never broken, and Network Address Translation, e.g., $V_{NAT1}$, remained invoked. Throughout the process NAT routing continued. What was destroyed and recreated, with reversed HTTP transaction roles, was interaction at the HTTP layer, which now functions as an inbound connection to a private IP address, e.g., to agent 312*b*.

Now, the reversed HTTP roles having been taken, the original, private address client-requestor, e.g., agent 312*b*, can open a second, normal HTTP circuit to the original public address server, e.g., node 12*a*. At this point, each agent or computer node has a valid HTTP client-server connection to the other. In other words, an arrangement as illustrated in FIG. 7 wherein one HTTP layer session provides communication in a first direction and a second HTTP layer session provides communication in the opposite direction.

As may be appreciated, both agents 312*a* and 312*b* execute concurrently as server and client programming. Both agents 312*a* and 312*b* can now issue and process HTTP requests symmetrically, bi-directionally, in a normal fashion, despite the fact they do not share a common address space. As such, agent 312*a* and agent 312*b* each have mixed HTTP transaction roles, and may establish, or request the establishment of additional HTTP connections in either direction, as may be required.

FIG. 11 through FIG. 15 illustrate multiple HTTP exchanges between computer nodes as coupled by way of a network in establishing a non-polling, bi-directional symmetrical, peered communication according to an embodiment of the present invention. In FIG. 11 through FIG. 15, messages originating from node 412*a* are indicated by reference numeral 412*a* and messages originating from node 412*b* are indicated by reference numeral 412*b*.

FIG. 11 illustrates the initial TCP/IP connection handshake between node 412*a* and node 412*b*. Node 412*b* is private, and 412*a* is public. After the handshake completes, a TCP connection exists between 412*b* and 412*a*.

FIG. 12 illustrates the initial HTTP request by node 412*b* to 412*a*. At this point in time, the HTTP connection is conventional, i.e. private node 412*b* is the HTTP client and public node 412*a* is the HTTP server.

FIG. 13 illustrates dialog between node 412*a* and node 412*b* used to reverse HTTP roles. Node 412*a* is supplying a response to the request made by node 412*b* in FIG. 12. In FIG. 13, the message "TACT:DFLIP" presented by node 412*a* is an HTTP header declaring the role reversal by the current server, e.g., by node 412*a* in the present example. Following the exchange illustrated in FIG. 13, the initial conversation has ended. HTTP roles have been reversed, but the initial TCP/IP connection from FIG. 11 has been preserved. HTTP roles, inherently unidirectional, need not revert back for the rest of that TCP/IP connection. From this point on, public node 412*a* can now be the HTTP client and private node 412*b* can be the HTTP server for this particular TCP/IP connection. If the original TCP/IP connection created in FIG. 11 is interrupted, the actions illustrated in FIG. 11 through FIG. 13 can be performed again by both node 412*a* and node 412*b* in the same order.

FIG. 14 illustrates a new HTTP session between node 412*a* and node 412*b* following role reversal, but on the original TCP/IP connection created in FIG. 11. Note that 412*a* initiated the HTTP session, indicating that public node 412*a* is now the HTTP client and private node 412*b* is now the HTTP server.

FIG. 15 illustrates an additional HTTP session between node 412*a* and node 412*b*, still on the original TCP/IP connection from FIG. 11. Note that 412*a* initiated the HTTP session, indicating that public node 412*a* is still the HTTP client and private node 412*b* is still the HTTP server.

Under certain embodiments of the invention, it would be possible to manage a peered connection over a single TCP/IP circuit. A hybrid client/server agent could be used at each node, to multiplex and de-multiplex HTTP transactions, depending upon the initial direction of the transaction. While this might not be the most efficient implementation, it might be desirable due to other constraints, e.g., as to the number of available TCP/IP sockets.

As suggested above, in addition to NAT devices, proxy and relay functions and entities can be a part of the network communications chain.

RFC 2616 states:

A more complicated situation occurs when one or more intermediaries are present in the request/response chain. There are three common forms of intermediary: proxy, gateway, and tunnel. A proxy is a forwarding agent, receiving requests for a URI in its absolute form, rewriting all or part of the message, and forwarding the reformatted request toward the server identified by the URI. A gateway is a receiving agent, acting as a layer above some other server(s) and, if necessary, translating the requests to the underlying server's protocol. A tunnel acts as a relay point between two connections without changing the messages; tunnels are used when the communication needs to pass through an intermediary (such as a firewall) even when the intermediary cannot understand the contents of the messages.

Figure 16:
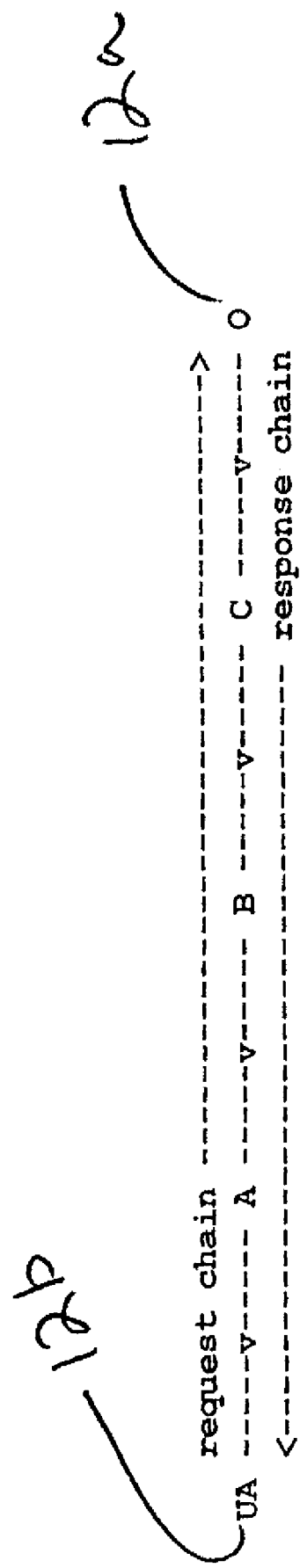
FIG. 16 illustrates communication by way of multiple intermediaries between a pair of computer nodes communicating according to an embodiment of the present invention.

FIG. 16 shows three intermediaries A, B, and C between a user agent node 12b and an origin server node 12a. A request or response message that travels the whole chain will pass through four separate connections. This distinction is important because some HTTP communication options may apply only to the connection with the nearest, non-tunnel neighbor, only to the end-points of the chain, or to all connections along the chain. Although the diagram is linear, each participant may be engaged in multiple, simultaneous communications. For example, B may be receiving requests from many clients other than A, and/or forwarding requests to servers other than C, at the same time that it is handling A's request.

With respect to passing "through an intermediary (such as a firewall)", RFC 2616 provides as follows:

9.9 CONNECT command:

This specification reserves the method name CONNECT for use with a proxy that can dynamically switch to being a tunnel (e.g. SSL tunneling [44]).

Reference "[44]" above is to Luotonen, A., "Tunneling TCP based protocols through Web proxy servers. Work In Progress" an expired Internet Engineering Task Force (IETF) document dealing with Secure Socket Layer encryption (SSL.) While this specification was never accepted officially, it is the sole reference to a standard method of implementation for HTTP proxying via CONNECT, and has, therefore, been adopted wholesale without, as yet, being supplanted. Secure HTTP (S-HTTP or HTTPS) is HTTP implemented over Secure Socket Layer, and Web Proxy-relay services generally according to Luotonen's specification.

Embodiments of the present invention are compatible with web proxy relay servers as defined in RFC 2616.

Embodiments of the present invention are compatible with web proxy-relay servers implementing the HTTP CONNECT command transaction sequence according to Luotonen.

Figure 17:
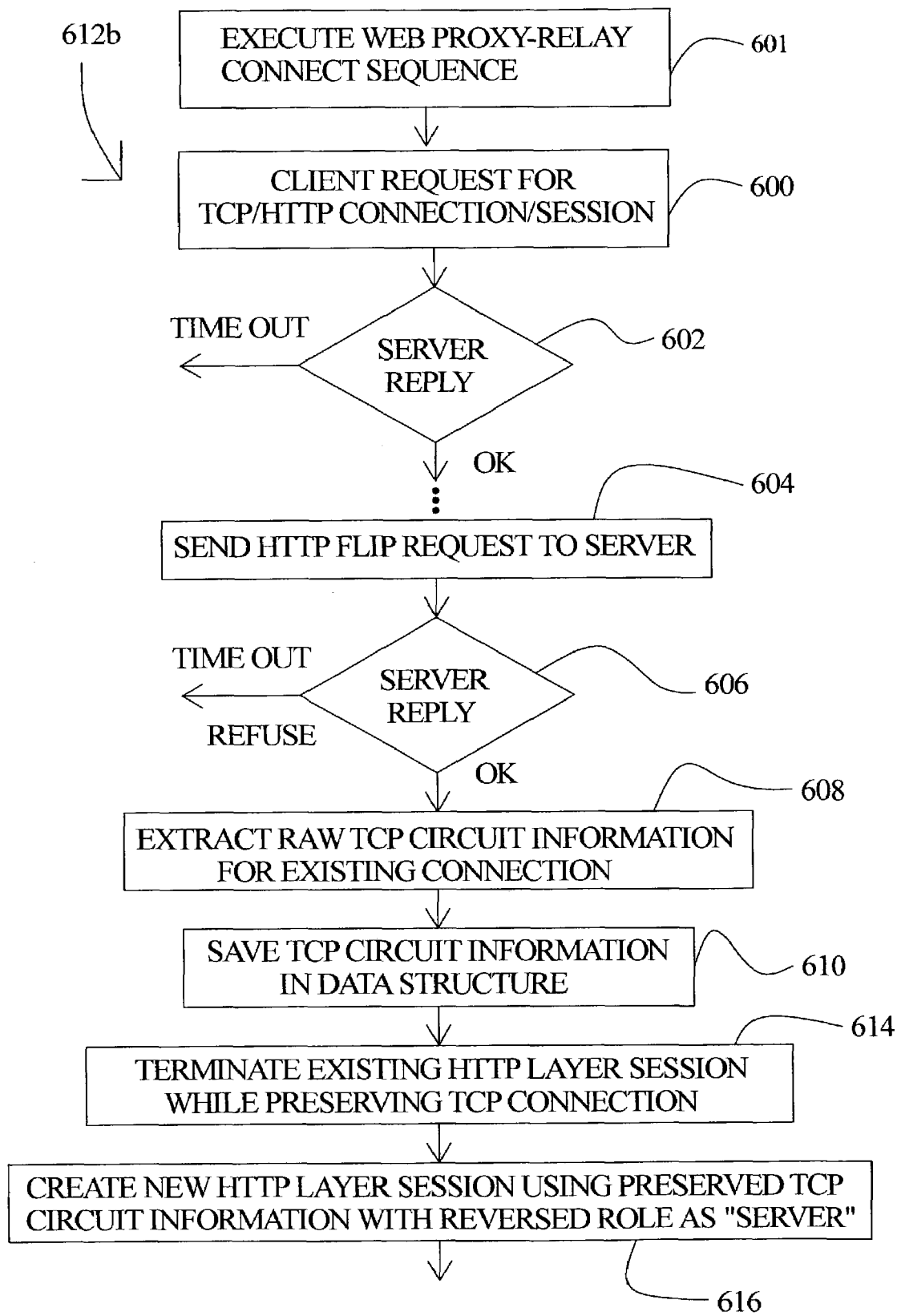
FIG. 17 is a flowchart illustrating a computer node establishing communication including an intervening proxy-relay according to an embodiment of the present invention.

FIG. 17 shows the HTTP CONNECT sequence in block 601 executed by an agent 612b in establishing a proxy-relay, as a preamble to a sequence such as illustrated in FIG. 9. Thus, agent 612b in FIG. 17 corresponds to agent 312b in FIG. 9 and blocks 500, 502, 504, 506, 508, 510, 512, and 514 in FIG. 9 correspond to blocks 600, 602, 604, 606, 608, 610, 614, and 616 of FIG. 17.

As Luotonen states:

6. Security Considerations

The CONNECT tunneling mechanism is really a lower-level function than the rest of the HTTP methods, kind of an escape mechanism for saying that the proxy should not interfere with the transaction, but merely forward the data. In the case of SSL tunneling, this is because the proxy should not need to know the entire URI that is being accessed (privacy, security), only the information that it explicitly needs (hostname any port number) in order to carry out its part.

Due to this fact, the proxy cannot necessarily verify that the protocol being spoken is really what it is supposed to tunnel (SSL for example), and so the proxy configuration should explicitly limit allowed connections to well-known ports for that protocol (such as 443 for HTTPS, 563 for SNEWS, as assigned by IANA, the Internet Assigned Numbers Authority).

Following Luotonen, embodiments of the present invention do not necessarily make use of implementations of SSL. However, practice may indicate that employment of embodiments of the present invention as a means of traversing web proxy-relays will benefit from transactions and data exchanged over a peered connection complying with SSL protocols.

Figure 18:
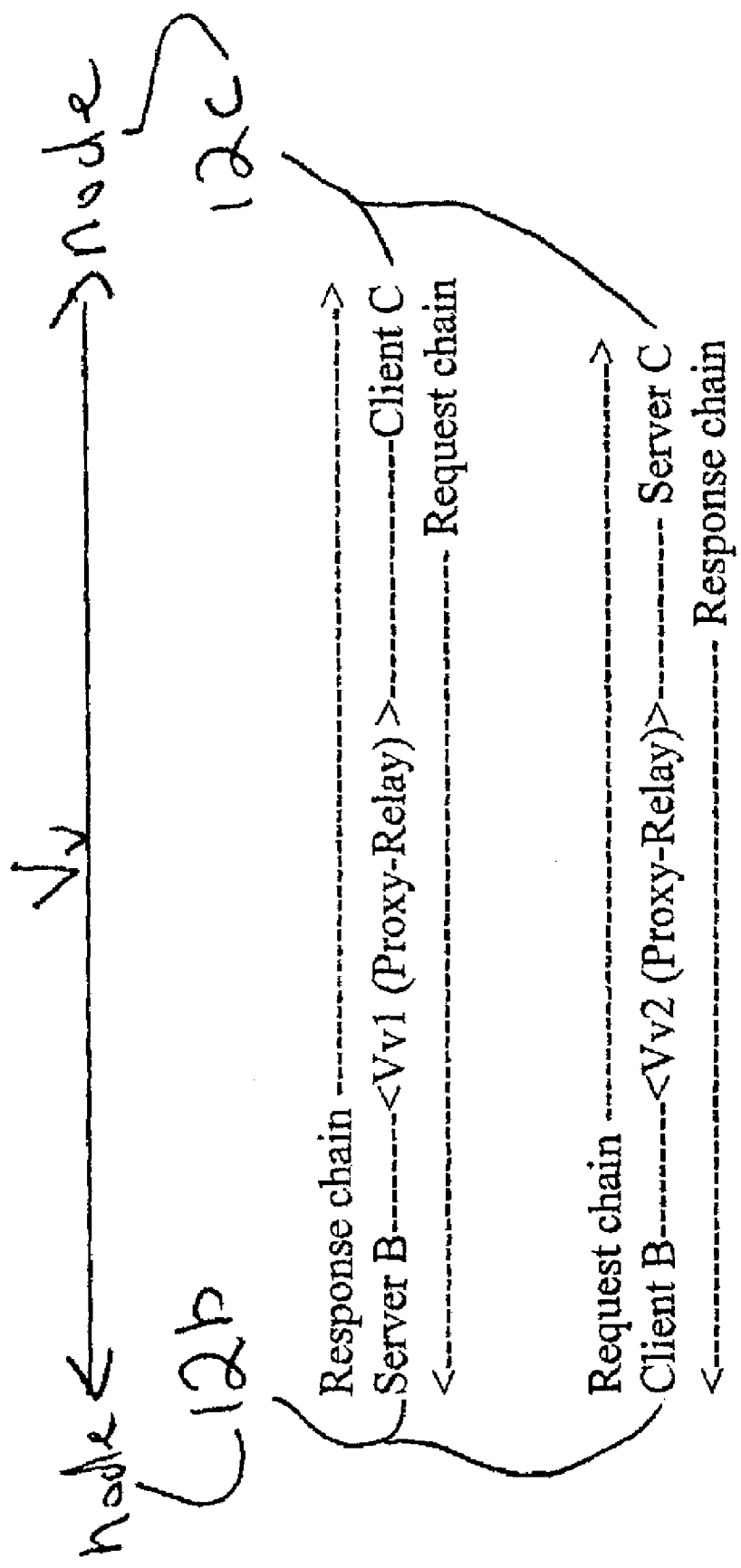
FIG. 18 illustrates communication including an intervening proxy-relay according to an embodiment of the present invention.

As illustrated in FIG. 18, a public node (not shown) can broker a discrete peered connection, e.g., between two private address nodes 12b and 12c, by assuming a role of a proxy relay to establish a symmetrical, bi-directional relationship between the private nodes 12b and 12c as described above. All HTTP requests, responses and data pass back and forth, transparently, over what is in effect a virtual circuit Vv, between those two private nodes. Virtual circuit Vv includes a FLIP1 S-HTTP connection carried on virtual circuit Vv1 and a NON-FLIP2 S-HTTP connection carried on virtual circuit Vv2. Virtual circuit Vv thereby supports a peered connection between private nodes 12b and 12c.

The duration of a given asymmetrical transactional session, e.g., HTTP session, varies, but can terminate by time-out. Thus, the ability of a given node to initiate a communication, e.g., a public node ability to initiate a conversation with a private node by flipped connection, may end or be interrupted depending on the particular implementation and on the relative value assign to such ability. For example, a KEEP ALIVE command can be used to extend the duration of a reversed-role HTTP connection and thereby extend the duration of a given node's ability to initiate a conversation, e.g., extend the duration of time in which a pubic node can initiate a conversation with a private node. Alternatively, a given node can re-initiate a reversed-role session when it detects loss of such a connection with another node, e.g., a private node can reconnect with a public node and flip the connection if such connection is deemed of sufficient value. If such re-establishment becomes necessary, a unique session identifier, such as that provided by the HTTP session URI, facilitates resumption of any broken transaction through correlation of the new session with the state of the previous session. More importantly, it permits resumption of the transaction in a secure manner which excludes the possibility of replay attacks.

Thus, symmetrical bi-directional communication may be established between computer nodes interconnected by a network.

As used herein the term HTTP refers generally to existing HTTP standards and extension, as well as corresponding predecessor and descendant standards and extensions. As used herein, the term HTTP refers generally to a transactional session method of communication wherein participants provide and execute programming agents having certain transaction roles. HTTP accommodates session programming agents providing in combination an initiator role capable of opening an HTTP session and a client role capable of submitting HTTP requests. HTTP accommodates session programming agents providing in combination a responder role capable of accepting an HTTP session a server role capable of responding to HTTP requests. HTTP sessions are identifiable uniquely by a Uniform Resource Identifier (URI). URI's permit HTTP transactions to be linked within a limited domain. It will be appreciated that embodiments of the current invention utilizing transactional sessions which are uniquely identifiable, e.g. by means of HTTP session URI's, may be readily grouped, as illustrated in FIG. 19.

Figure 19:
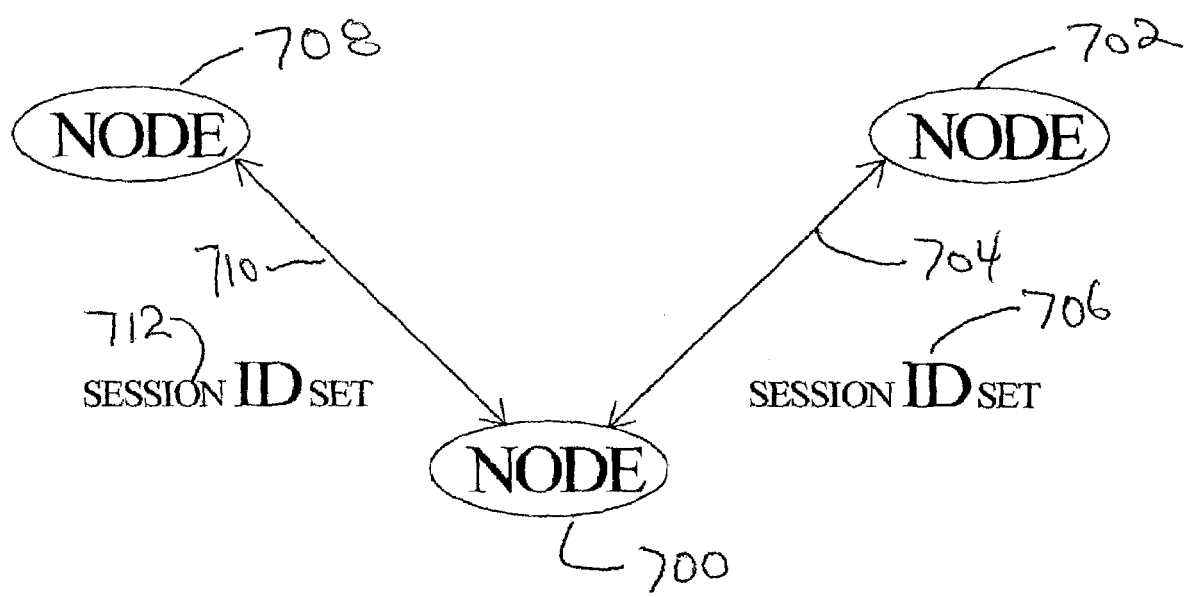
FIG. 19 illustrates symmetric bi-directional communication between computer nodes according to an embodiment of the present invention.

FIG. 19 illustrates application of peered connections in association with computer node communication according to an embodiment of the present invention. In FIG. 19, a computer network node 700 communicates with a second computer network node 702 by way of peered connection 704. As previously described herein, peered connection 704 includes two or more symmetric transactional sessions, e.g., HTTP sessions, having opposite symmetry. By virtue of such opposite symmetry, each of nodes 700 and 702 has an ability to initiate communication with the other. By employing transactional sessions in support of peered connection 704, the set of asymmetric transactional sessions comprising peered connection 704 can be identified by a session ID set 706. Session ID set 706 includes unique identifiers for each of the individual asymmetric transactional sessions comprising peered connection 704. Thus, use of embodiments of the present invention is augmented by employing session ID set 706 in connection with communications passed along peered connection 704. In this manner, each of nodes 700 and 702 can pass a copy of session ID set 706 as a means of identifying transactional sessions associated with peered connection 704.

FIG. 19 also illustrates a computer network node 708 enjoying bi-directional symmetric communication with node 700 by means of peered connection 710. Peered connection 710 includes two or more asymmetric transactional sessions, e.g., oppositely directed HTTP sessions. Each of the asymmetric sessions comprising peered connection 710 have an associated unique identifier. A session ID set 712 may be used in association with peered connection 710 to identify that set of asymmetric transactional sessions currently associated with peered connection 710.

As may be appreciated, a given peered connection, e.g., the various peered connections described herein, can dynamically allocate and de-allocate asymmetric transactional sessions as needed. Accordingly, introducing a new asymmetric transactional session into a given peered connection can include a new member of a session ID set. Similarly, withdrawing a given asymmetric transactional session from a given peered connection can include removing the associated member of a given session ID set. In this manner, a given session ID set provides to participating computer network nodes a mechanism for identifying those asymmetric transactional sessions associated and currently comprising a given peered connection.

Thus, node 700 having ongoing communication through peered connection 704 with node 702 and ongoing communication with node 708 through peered connection 710 can manage incoming and outgoing communications by reference to a session ID set.

It will be appreciated that the present invention is not restricted to the particular embodiments been described and illustrated, and that variations may be made therein without departing from the scope of the invention as found in the appended claims and equivalents thereof.

What is claimed is:

1. A method of establishing communication between a first node and a second node, said first node and said second node each being coupled to and addressable by way of a network, said first node having a first address, the method comprising:
sending from said second node to said first node via said first address a session request, said session being uniquely identifiable; accepting said session request at said first node and creating a session, said session including establishment of a network connection; sending from said second node to said first node, via said session, a flip request; preserving at said first node said network connection; terminating at said first node said session; acknowledging from said first node to said second node said flip request; terminating at said second node said session; sending from said first node to said second node via said network connection a second session request; accepting said second session request at said second node, said second session including interaction via said network connection, said session being uniquely identifiable;
said method further comprising communication between said first node and a third node, said third node being a private node, said method further comprising: sending from said third node to said first node via said first address a third session request; accepting said third session request at said first node and creating a third session, said third session including establishment of a second network connection; sending from said third node to said first node, via said third session, a second flip request; preserving at said first node said second network connection; terminating at said first node said third session; acknowledging from said first node to said third node said second flip request; terminating at said third node said third session; sending from said first node to said third node via said second network connection a fourth session request; and accepting said fourth session request at said third node, said fourth session including interaction via said second network connection; and said first node serving as a communication intermediary between said second node and said third node.

2. The method of claim 1, wherein said first node is a public node and said first address is a public address.

3. The method of claim 1, wherein said network connection comprises a global TCP network connection.

4. The method of claim 1, wherein said session comprises an asymmetric transactional role communication session.

5. The method of claim 4, wherein said asymmetrical transaction role communication session comprises at least one of an HTTP session and an HTTP extension session.

6. The method of claim 1, wherein said network connection comprises a TCP network connection.

7. The method of claim 1, wherein said session comprises an asymmetric transactional session.

8. The method of claim 7, wherein said asymmetric. transactional session comprises at least one of an HTTP session and an HTTP extension session.

9. The method of claim 8, wherein said at least one of said HTTP and said HTTP extension session comprise a tunneled network connection.

10. The method of claim 9, wherein said tunneled network connection comprises a secure socket layer connection.

* * * * *